US007386428B1

(12) United States Patent
Hallquist et al.

(10) Patent No.: US 7,386,428 B1
(45) Date of Patent: Jun. 10, 2008

(54) METHOD AND SYSTEM FOR GUIDED CABLE CONTACT IN FINITE ELEMENT ANALYSIS

(75) Inventors: John O. Hallquist, Livermore, CA (US); Mu Lu, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 663 days.

(21) Appl. No.: 11/025,198

(22) Filed: Dec. 29, 2004

(51) Int. Cl.
*G06F 17/50* (2006.01)
*B25J 9/10* (2006.01)
(52) U.S. Cl. ............................ 703/2; 703/1; 73/12.01; 702/42; 702/102
(58) Field of Classification Search ............ 703/2, 703/7, 1; 73/12, 12.01; 700/245; 702/42, 702/102
See application file for complete search history.

(56) References Cited

U.S. PATENT DOCUMENTS

| 2004/0040369 A1* | 3/2004 | Hoo Fatt et al. ............ 73/12.01 |
| 2004/0059448 A1* | 3/2004 | Nono et al. .................... 700/97 |
| 2005/0113973 A1* | 5/2005 | Endo et al. ................... 700/245 |

* cited by examiner

*Primary Examiner*—Thai Phan
(74) *Attorney, Agent, or Firm*—Roger H. Chu (57) ABSTRACT

A system, method and software product to simulate guided cable contacts is disclosed. The guided cable contact includes a slave node and an associated beam. A normal vector is established between the slave node's projection point and the slave node. Each of the slave node and two end nodes of the beam has three translational degrees-of-freedom. A spring is placed between the slave node's projection point and the slave node. The spring constant is assigned such that the spring is substantially stiffer than that of the beam. The guided cable contact stiffness matrix is then calculated using the spring constant, the normal vector, the length of the beam, and the distance between the first end node of the beam and the projection point. According to one aspect, the guided cable contact may be used for modeling human spinal column.

17 Claims, 11 Drawing Sheets

$$\overline{AB} = l$$

$$\overrightarrow{AP} = \overrightarrow{AS} \cdot \tau = l_a$$

$$\overline{PS} = \left\| \overrightarrow{AS} - \overrightarrow{AP} \right\| = \left\| \overrightarrow{AS} - l_a \cdot \tau \right\| = D$$

404

$$\Delta F = \begin{Bmatrix} \Delta F_s \\ \Delta F_a \\ \Delta F_b \end{Bmatrix} = \begin{Bmatrix} -n \\ an \\ bn \end{Bmatrix} \Delta P$$

$$a = \frac{l - l_a}{l} \quad b = \frac{l_a}{l}$$

$\Delta P = k \, \Delta D$ — 412

$\Delta D = \begin{bmatrix} -\mathbf{n}^T & a\mathbf{n}^T & b\mathbf{n}^T \end{bmatrix} \underbrace{\begin{matrix} \Delta \mathbf{d}_s \\ \Delta \mathbf{d}_a \\ \Delta \mathbf{d}_b \end{matrix}}$ — 414

$\mathbf{K} = k \begin{bmatrix} \mathbf{n}\mathbf{n}^T & -a\mathbf{n}\mathbf{n}^T & -b\mathbf{n}\mathbf{n}^T \\ -a\mathbf{n}\mathbf{n}^T & a^2\mathbf{n}\mathbf{n}^T & ab\mathbf{n}\mathbf{n}^T \\ -b\mathbf{n}\mathbf{n}^T & ab\mathbf{n}\mathbf{n}^T & b^2\mathbf{n}\mathbf{n}^T \end{bmatrix}$ — 418

METHOD AND SYSTEM FOR GUIDED CABLE CONTACT IN FINITE ELEMENT ANALYSIS

BACKGROUND OF THE INVENTION

1. Field of the Invention

The present invention generally relates to method, system and software product used in finite element analysis, more particularly to numerically simulating of the structural behaviors of a guided cable contact.

2. Description of the Related Art

Finite element analysis (FEA) is a computerized method widely used in industry to model and solve engineering problems relating to complex systems. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

FEA is becoming increasingly popular with automobile manufacturers for optimizing both the aerodynamic performance and structural integrity of vehicles. Similarly, aircraft manufacturers rely upon FEA to predict airplane performance long before the first prototype is built. Rational design of semiconductor electronic devices is possible with Finite Element Analysis of the electrodynamics, diffusion, and thermodynamics involved in this situation. FEA is utilized to characterize ocean currents and distribution of contaminants. FEA is being applied increasingly to analysis of the production and performance of such consumer goods as ovens, blenders, lighting facilities and many plastic products. In fact, FEA has been employed in as many diverse fields as can be brought to mind, including plastics mold design, modeling of nuclear reactors, analysis of the spot welding process, microwave antenna design, simulating of car crash and biomedical applications such as the design of prosthetic limbs. In short, FEA is utilized to expedite design, maximize productivity and efficiency, and optimize product performance in virtually every stratum of light and heavy industry. This often occurs long before the first prototype is ever developed.

Generally, FEA begins by generating a finite element model of a system. In this model, a subject structure is reduced into a number of node points which are connected together to form finite elements. Governing equations of motion are written in a discrete form, where the motions of each node point are the unknown part of the solution. A simulated load or other influence is applied to the system and the resulting effect is analyzed using well known mathematical methods.

FEA software can be classified into two general types, implicit FEA software and explicit FEA software. Implicit FEA software uses an implicit equation solver to solve a system of coupled linear equations. Such software is generally used to simulate static or quasi-static problems. Explicit FEA software does not solve coupled equations but explicitly solves for each unknown assuming them uncoupled. Explicit FEA software usually uses central difference time integration which requires very small solution cycles or time steps for the method to be stable and accurate. Explicit FEA software is generally used to simulate short duration events where dynamics are important such as impact type events.

One of the most challenging FEA tasks is to simulate an impact event such as car crash. With the advance of the computer technologies and with the advantage of parallel processing, the FEA model for the car crash simulation has become very sophisticated. The number of elements to model a car has increased from several thousands a decade ago to more than one million today. Instead of using a few rigid links to model the dummy driver, a very complicated bio-mechanical human model is used in today's model. In order to model the bio-mechanical model adequately, the spinal column must be included. This leads to a new challenge to numerically simulate the behaviors of the spinal column. It is therefore desirable to have a new method to numerically simulate a human model in a car crash analysis more efficiently and effectively.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention discloses a system, method and software product to numerically simulate guided cable contacts. According to one aspect of the present invention, a guided cable contact includes a slave node and an associated beam. The beam together with the slave node defines a unique plane. A normal vector is established between the slave node and its projection point on the beam. Each of the slave node and two end nodes of the beam has three translational degrees-of-freedom. A spring is placed between the projection point and the slave node. The spring constant is assigned such that the spring is substantially stiffer than that of the beam. The guided cable contact stiffness matrix is then calculated using the spring constant, the normal vector, the length of the beam, and the distance between the first end node of the beam and the projection point. According to another aspect, the guided cable contact may be used for modeling human spinal column with the beam as vertebral body and with the slave node as one of the spinous processes, such that the beam emulates the movement of the vertebrae and the slave node tracks the movements of the beam with a predetermined offset.

According to one embodiment, the present invention is a method for modeling one or more guided cable contacts in a time-domain simulation of finite element analysis, the method comprising: defining a plurality of material properties and a geometry of a structure including said one or more guided cable contacts, wherein the structure is represented by a plurality of nodes and a plurality of elements, assigning initial displacements, velocities and accelerations of each of the nodes, determining a time step and a current solution cycle, when the current solution cycle is less than termination time, calculating guided cable contact stiffness matrix for said one or more guided cable contacts, defining an effective loads array, and obtaining nodal displacements.

According to another embodiment, the present invention is another method for forming one or more guided cable contact stiffness matrices, the method comprising: defining a slave node, locating a beam having a first and a second end node, establishing a normal vector between the projection point and the slave node, determining a spring constant used for connecting the slave node and the beam, and calculating the guided cable contact stiffness matrices using the spring constant, the normal vector, length of the beam, and distance between the first end node and the projection point.

One of the objects, features, and advantages of the present invention is to model the human spinal column with guided cable contacts effectively and efficiently in finite element analysis. The guided cable contact allows modeling the movements of the spinal column from the back muscles and ligaments attaching to various transverse processes and spinous processes with the beam element, and the corresponding vertebrae with the slave nodes. Another one of the objects, features and advantages of the present invention is the automated creation of guided cable contacts in finite element program. Users need only to specify the slave nodes to represent a human spinal column. The application module automatically generates all of the required guided cable contacts from a finite element analysis model, which may contain tens of thousands of nodes.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

To facilitate the description of the present invention, it deems necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art:

FEA stands for Finite Element Analysis.

Implicit FEA refers to $K u=F$, where K is the effective stiffness matrix, u is the unknown displacement array and F is the effective loads array. F is a right hand side loads array while K is a left hand side stiffness matrix. The solution is performed at the global level with a factorization of the effective stiffness matrix, which is function of the stiffness, mass and damping. One exemplary solution method is the Newmark integration scheme.

Explicit FEA refers to $Ma=F$, where M is the diagonal mass array, a is the unknown nodal acceleration array and F is the effective loads array. The solution can be carried out at element level without factorization of a matrix. One exemplary solution method is called the central difference method.

Time domain analysis refers to a FEA that simulates a physical phenomenon in time domain. One of the solution methods for the time domain FEA is direct integration scheme, which may be carried out as either implicit or explicit solution schemes.

Dynamic analysis refers to a FEA that accounts for the mass and inertia effects of a structure. In general, there are two classes of dynamic analysis: time domain and frequency domain.

Solution cycle and cycle are used interchangeably to refer to the numbered solution states starting with cycle 0 at time $t=0$.

The time step $\Delta t$ refers to an interval of time between subsequent cycles.

Six degrees-of-freedom refer to three translations and three rotations of a nodal point in three-dimensional space. Each of the nodes in a guided cable contact has three translational degrees-of-freedom.

Loading Condition is defined as the external loads acting on a structure. Effective loads include the external loads and the internal loads such as the inertial forces and damping forces that are based upon the nodal displacements and/or velocities and accelerations at the previous solution cycle or cycles.

Global coordinate system is a coordinate system used to define the structure in FEA.

Embodiments of the present invention are discussed herein with reference to FIGS. 1A-5C. However, those skilled in the art will readily appreciate that the detailed description given herein with respect to these figures is for explanatory purposes as the invention extends beyond these limited embodiments.

Figure 1A:
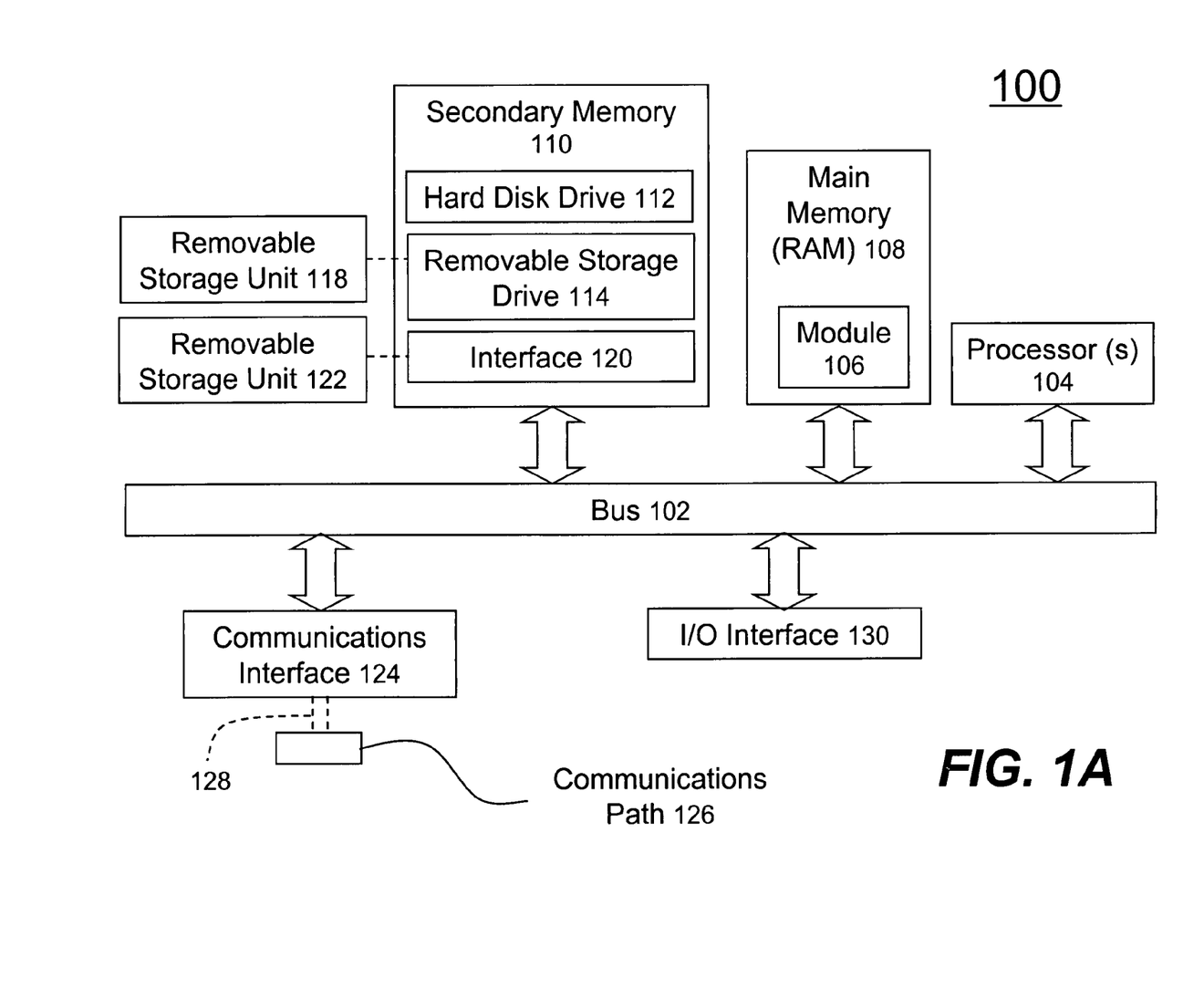
FIG. 1A depicts a block diagram of an exemplary computer, in which one embodiment of the present invention may be implemented.

Referring now to the drawings, in which like numerals refer to like parts throughout several views. The present invention may be implemented using hardware, software or a combination thereof and may be implemented in a computer system or other processing system. In fact, in one embodiment, the invention is directed towards one or more computer systems capable of carrying out the functionality described herein. An example of a computer system 100 is shown in FIG. 1A. The computer system 100 includes one or more processors, such as processor 104. The processor 104 is connected to a computer system internal communication bus 102. Various software embodiments are described in terms of this exemplary computer system. After reading this description, it will become apparent to a person skilled in the relevant art(s) how to implement the invention using other computer systems and/or computer architectures.

Computer system 100 also includes a main memory 108, preferably random access memory (RAM), and may also include a secondary memory 110. The secondary memory 110 may include, for example, one or more hard disk drives 112 and/or one or more removable storage drives 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc. which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 100. Such means may include, for example, a removable storage unit 122 and an interface 120. Examples of such may include a program cartridge and cartridge interface (such as that found in video game devices), a removable memory chip (such as an EPROM, or PROM) and associated socket, and other removable storage units 122 and interfaces 120 which allow software and data to be transferred from the removable storage unit 122 to computer system 100. In general, Computer system 100 is controlled and coordinated by operating system (OS) software, which performs tasks such as process scheduling, memory management, networking and I/O services. Exemplary OS includes Linux®, Microsoft Windows®.

There may also be a communications interface 124 connecting to the bus 106. Communications interface 124 allows software and data to be transferred between computer system 100 and external devices. Examples of communications interface 124 may include a modem, a network interface (such as an Ethernet card), a communications port, a PCMCIA slot and card, etc. Software and data transferred via communications interface 124 are in the form of signals 128 which may be electronic, electromagnetic, optical, or other signals capable of being received by communications interface 124. These signals 128 are provided to communications interface 124 via a communications path (i.e., channel) 126. This channel 126 carries signals (or data flows) 128 and may be implemented using wire or cable, fiber optics, a phone line, a cellular phone link, an RF link and other communications channels.

The channel 126 facilitates a data flow 128 between a data network (e.g. 150 in FIG. 1B) and the computer 100 and typically executes a special set of rules (i.e., a protocol) to send data back and forth. One of the common protocols is TCP/IP (Transmission Control Protocol/Internet Protocol) commonly used in the Internet. In general, the communication interface 124 manages the assembling of a data file into smaller packets that are transmitted over the data network or reassembles received packets into the original data file. In addition, the communication interface 124 handles the address part of each packet so that it gets to the right destination or intercepts packets destined for the computer 100.

In this document, the terms "computer program medium" and "computer usable medium" are used to generally refer to media such as removable storage drive 114, a hard disk installed in hard disk drive 112, and signals 128. These computer program products are means for providing software to computer system 100. The invention is directed to such computer program products.

The computer system 100 may also include an I/O interface 130, which provides the computer system 100 to access monitor, keyboard, mouse, printer, scanner, plotter, and a like.

Computer programs (also called computer control logic) are stored as application modules 106 in main memory 108 and/or secondary memory 110. Computer programs may also be received via communications interface 124. Such computer programs, when executed, enable the computer system 100 to perform the features of the present invention as discussed herein. In particular, the computer programs, when executed, enable the processor 104 to perform the features of the present invention. Accordingly, such computer programs represent controllers of the computer system 100.

In an embodiment where the invention is implemented using software, the software may be stored in a computer program product and loaded into computer system 100 using removable storage drive 114, hard drive 112, or communications interface 124. The application module 106, when executed by the processor 104, causes the processor 104 to perform the functions of the invention as described herein.

In another embodiment, the present invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the present invention is implemented using a combination of both hardware and software.

The main memory 108 may be loaded with one or more application modules 106 that can be executed by one or more processors 104 with or without a user input through the I/O interface 130 to achieve desired tasks. In one embodiment, an application module is configured to facilitate representing the geometry of a structure including guided cable contact to be analyzed. The geometry includes a plurality of nodes and a plurality of elements. In another embodiment, the application module is configured to facilitate calculating the solution using implicit FEA analysis. In yet another embodiment, the application module is configured to facilitate solving the FEA with explicit scheme. In operation, when at least one processor 104 executes one of the application modules 106, the results are computed and stored in the secondary memory 110 (i.e., hard disk drive 112). The status of the computation (e.g., the progress of a time-domain simulation) is reported to the user via the I/O interface 130. The current deformed structure may be shown graphically for visual inspection. The graphical output is sent through the I/O interface 130 to a monitor.

Figure 1B:
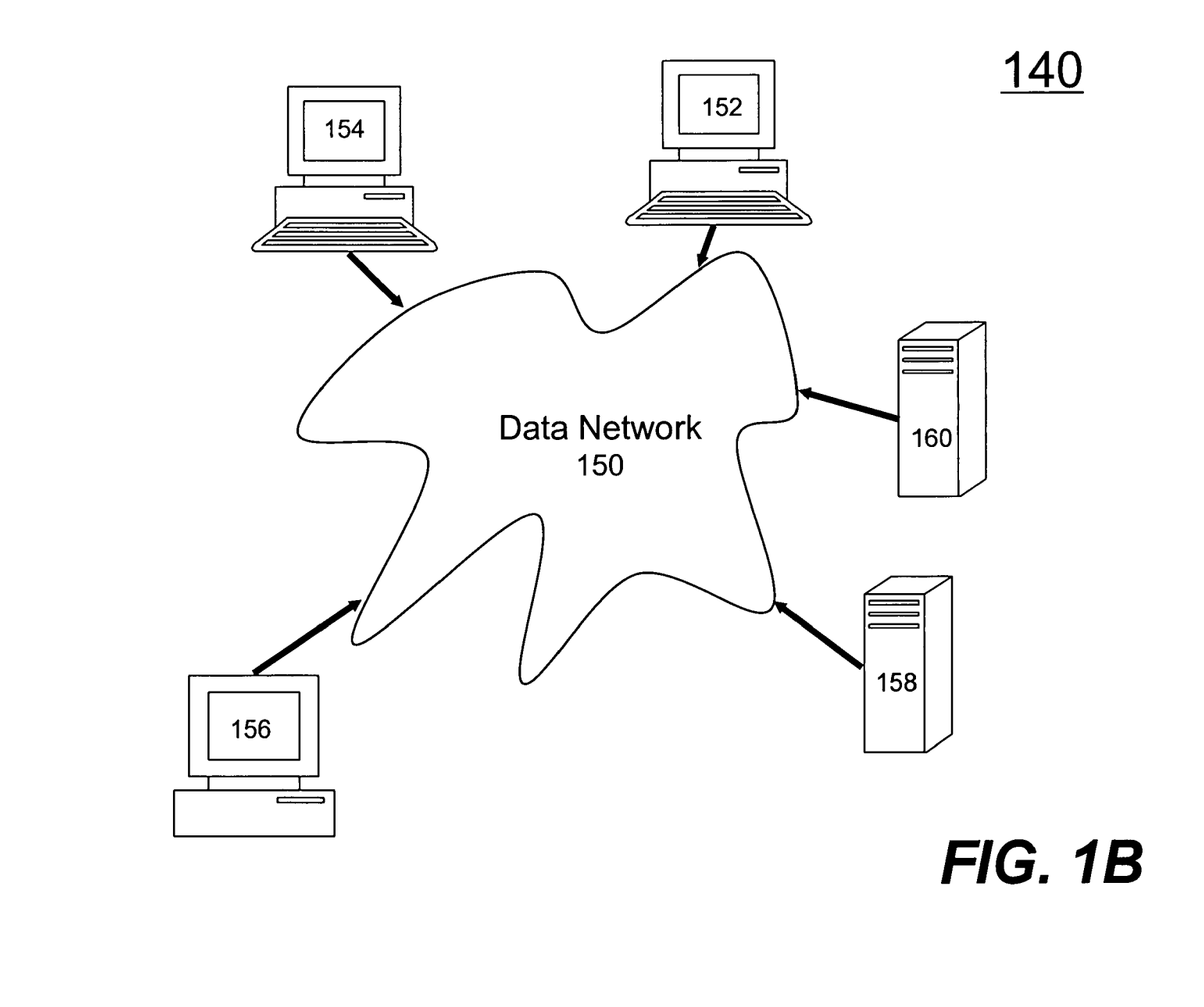
FIG. 1B depicts an exemplary network environment that another embodiment of the present invention may be implemented.

FIG. 1B depicts a networked computing environment 140, in which one embodiment of the present invention may be practiced. A plurality of network capable computing devices 152, 154, 156, 158 and 160 (e.g., the computer device 100 described in FIG. 1A) are coupled to a data network 150. These computing devices 152-160 can communicate with each other via the network 150. The data network 150 may include, but is not limited to, the Internet, an Intranet, local area network (LAN), wide area network (WAN), a wireless network or a data network comprises of public and private networks. In one embodiment, the FEA application module (i.e., 106 in FIG. 1A) is configured and executed on the computing device 160. A user may prepare an input file describing a FEA model on a personal workstation computing device 152. The input file is then sent to the computing device 160 via the network 150 to facilitate the computation of mesh-free analysis. During the execution of the application module, the user may be able to monitor the progress of the analysis at another computing device 156. Finally after the analysis is completed, the user may examine the computed results by retrieving the stored result file from the computer 160 to any one of the computing devices 152, 154 or 156 for a post-processing, which in general includes a graphical representation of the analysis results.

In one embodiment, one or more bio-mechanical dummies representing the driver and the passengers of an automobile are modeled in a FEA. Each of the bi-mechanical dummy models represents the realistic human behaviors during a car crash. One of the important human responses is the movement of the spinal column reacting to the sudden impact loading conditions. To model the spinal column properly, beam elements are chosen for modeling vertebral body. Each of the transverse processes (i.e., 504 in FIG. 5A) of the vertebrae connecting to one of the back muscles (e.g., 540 of FIG. 5C) is modeled with guided cable contact. The movements of the spinal column are simulated with the flexibility of the beam elements and associated guided cable contacts. One exemplary implementation of this technique is included in a well-known engineering computer program product, LS-DYNA™, offered by Livermore Software Technology Corporation.

Figure 2A:
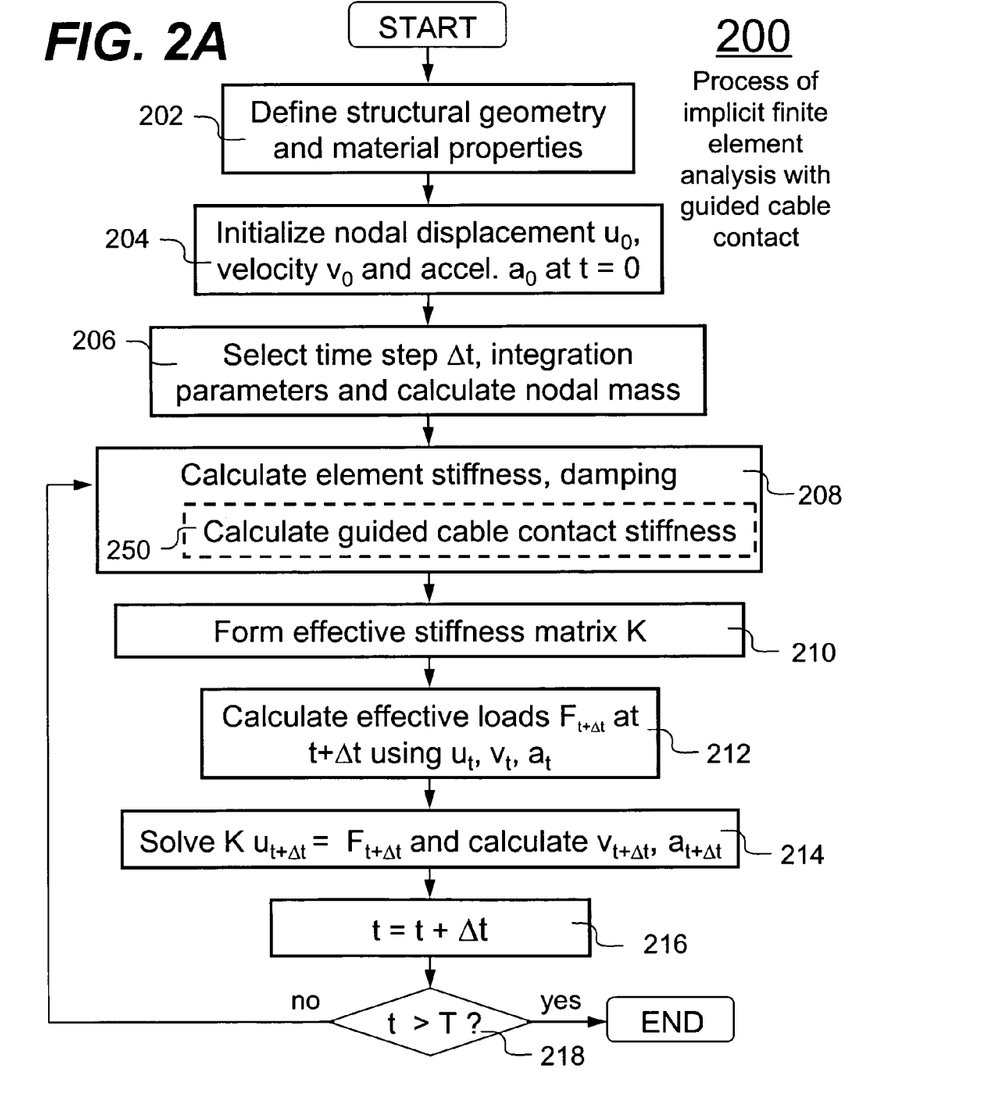
FIG. 2A shows a flowchart or process of implicit FEA including guided cable contact in accordance with one embodiment of the present invention.

Referring now to FIG. 2A, a flowchart 200 or process of implicit FEA with guided cable contact in accordance one embodiment of the present invention is shown. The process 200 may be implemented in software, hardware, or a combination of both. At 202, the process 200 defines a structure's geometry with nodes and elements as a FEA model. The material properties and associated constitutive law are also defined. In this embodiment, the geometry of one or more guided cable contacts is also defined at 202. At 204, the nodal displacements $u_0$, velocities $v_0$, and accelerations $a_0$, are initialized at initial solution cycle 0 (i.e., t=0). Then at 206, a time step $\Delta t$ is selected in association with the direct integration scheme. In the case of Newmark integration scheme, integration parameters $\alpha$ and $\delta$ are chosen. In embodiment, $\alpha$ is chosen to be ⅙ and $\delta$ is ½ corresponding to the linear acceleration assumption. In another embodiment, the constant-average-acceleration method is chosen when $\alpha$ is set to ¼ and $\delta$ ½. Also at 206, the process 200 calculates the nodal mass array M, which is used in the solution phase between 208 and 218. In some case, the nodal mass is recalculated during the solution phase (e.g., mass scaling). The process 200 moves to the solution phase after 206 for each solution cycle. At 208, the element stiffness and damping are calculated for each of the elements defined at 202. This includes the calculation of a guided cable contact stiffness matrix at 250, which is the process described in details in FIG. 2C in the below sections. At 210, all of the element stiffness, mass and damping matrices are assembled into a global effective stiffness matrix K in accordance with the integration method chosen at 206. Next at the 212, the process 200 calculates the effective nodal loads array $F_{t+\Delta t}$ solution cycle $t+\Delta t$. The effective loads array consists of the external loads at solution cycle $t+\Delta t$ and internal loads (e.g., inertial loads and damping loads) at solution cycle t. The inertial and damping loads are calculated using the time step, integration parameters, and nodal displacements $u_t$, velocities $v_t$ and accelerations at from the previous solution cycle t. At 214, the unknown nodal displacements $u_{t+\Delta t}$ are solved (i.e., K $u_{t+\Delta t}=F_{t+\Delta t}$). The effective stiffness matrix K is situated in the left hand side of the equal sign and the effective loads array $F_{t+\Delta t}$ is located in the right hand side. Because effective stiffness matrix is a positive definite symmetric matrix, the mathematical solution is to factorize the matrix K into a diagonal and a triangular matrix instead of matrix inversion. Once the nodal displacements $u_{t+\Delta t}$ are obtained, nodal velocities $v_{t+\Delta t}$ and accelerations $a_{t+\Delta t}$ solution cycle $t+\Delta t$ can be calculated using the velocities $v_t$ and accelerations $a_t$ from solution cycle t. Next at 216, the process 200 increments the solution cycle (i.e., $t=t+\Delta t$). Then at 218 the process 200 determines if the current solution cycle t has exceeded the total termination time T. When the solution solution cycle has not exceeded the total simulation time (i.e., test 218 is false), the process 200 goes back to 208 for another solution cycle until the test 218 is true. That is when the process 200 ends.

Figure 2B:
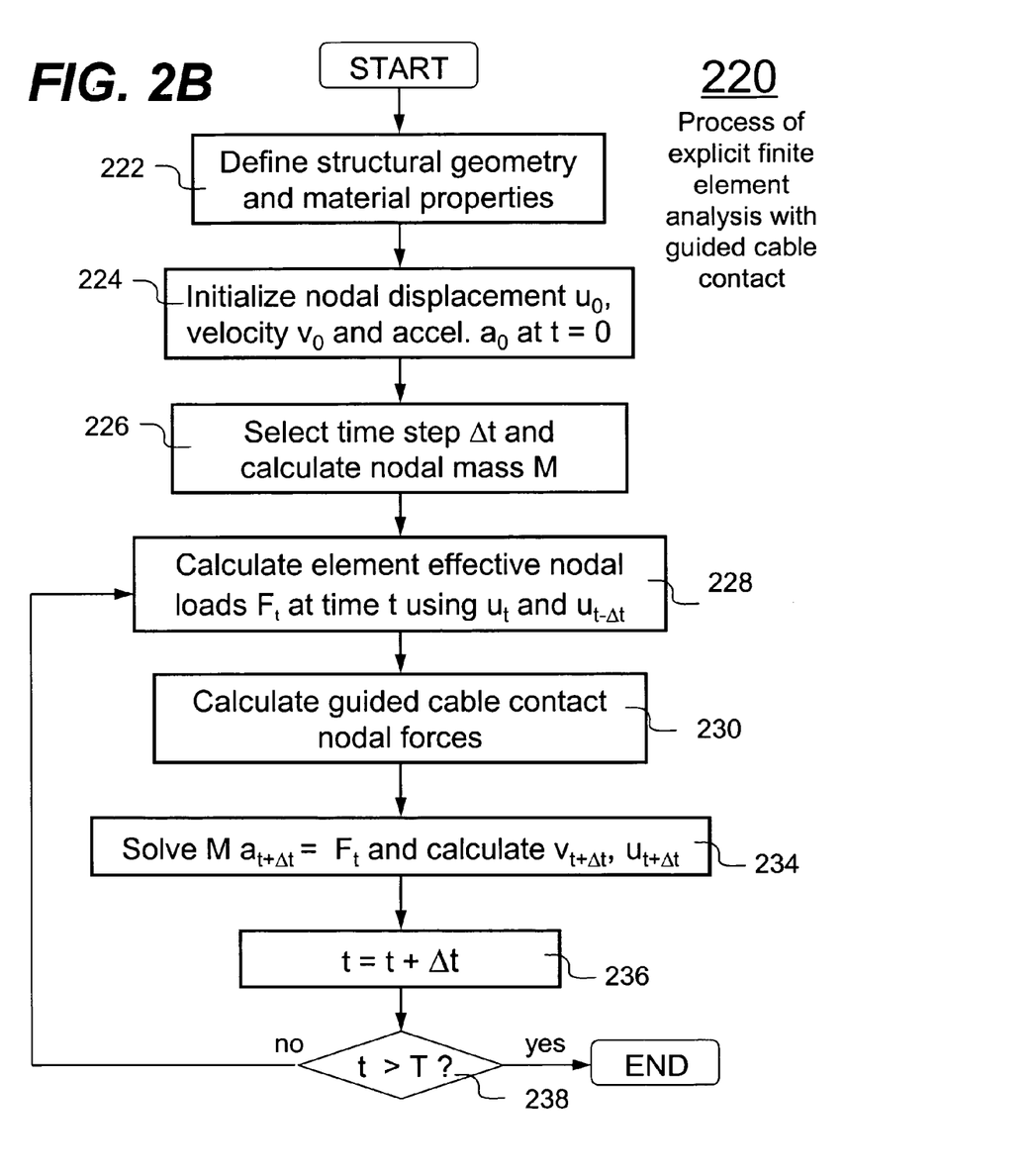
FIG. 2B shows a flowchart or process of explicit FEA including guided cable contact in accordance with one embodiment of the present invention.

FIG. 2B shows a process 220 or flowchart of explicit FEA with guided cable contact in accordance with one embodiment of the present invention. The process 220 may be implemented in software, hardware, or a combination of both. At 222, the process 220 defines the geometry of a structure to be analyzed by FEA. The geometry includes nodes and elements. Also defined at 222 are the material properties and corresponding constitutive law for all of the elements. Then the process 220 moves to 224, in which the nodal displacements $u_0$, velocities $v_0$, and accelerations $a_0$, are initialized at initial solution cycle 0 (i.e., t=0). And at 226, an adequate time step $\Delta t$ is selected. It is important to ensure the time step is small enough to have a stable solution in the explicit FEA scheme. In one embodiment, the time step is less than or equal to the smallest natural period of the structure divided by the order of the structure (i.e., $T_n/n$). The process 220 moves to the solution phase after 226 for each solution cycle until the predetermined simulation time T has been reached. Also at 226, the process 220 calculates the nodal mass array M, which is used in the solution phase between 228 and 238. Next at 228, the effective nodal loads $F_t$ for each of the elements is calculated at the solution cycle t. These nodal loads are calculated using nodal displacement $u_t$ and $u_{t-\Delta t}$ two previous solution cycles. At 230, the guided cable contact nodal forces are calculated. The details of the calculation process will be discussed later (i.e., 250 in FIG. 2C). At 234, the unknown nodal accelerations $a_{t+\Delta t}$ are solved (i.e., M $a_{t+\Delta t}=F_t$). After the nodal accelerations $a_{t+\Delta t}$ are obtained, the nodal velocities $v_{t+\Delta t}$ and displacements $u_{t+\Delta t}$ solution cycle $t+\Delta t$ can be calculated based on the central difference method. Because the nodal mass of each of the elements is decoupled from one another, the solution at 234 can be carried out in the element level without any matrix factorization or inversion. Next at 236, the process 220 increments the solution cycle (i.e., t=t+ Δt). Then at 238 the process 220 determines if the current solution cycle t has exceeded the total termination time T. When the solution cycle has not exceeded the total simulation time (i.e., test 238 is false), the process 220 goes back to 228 for another solution cycle until the test 238 is true. That is when the process 220 ends.

Figure 2C:
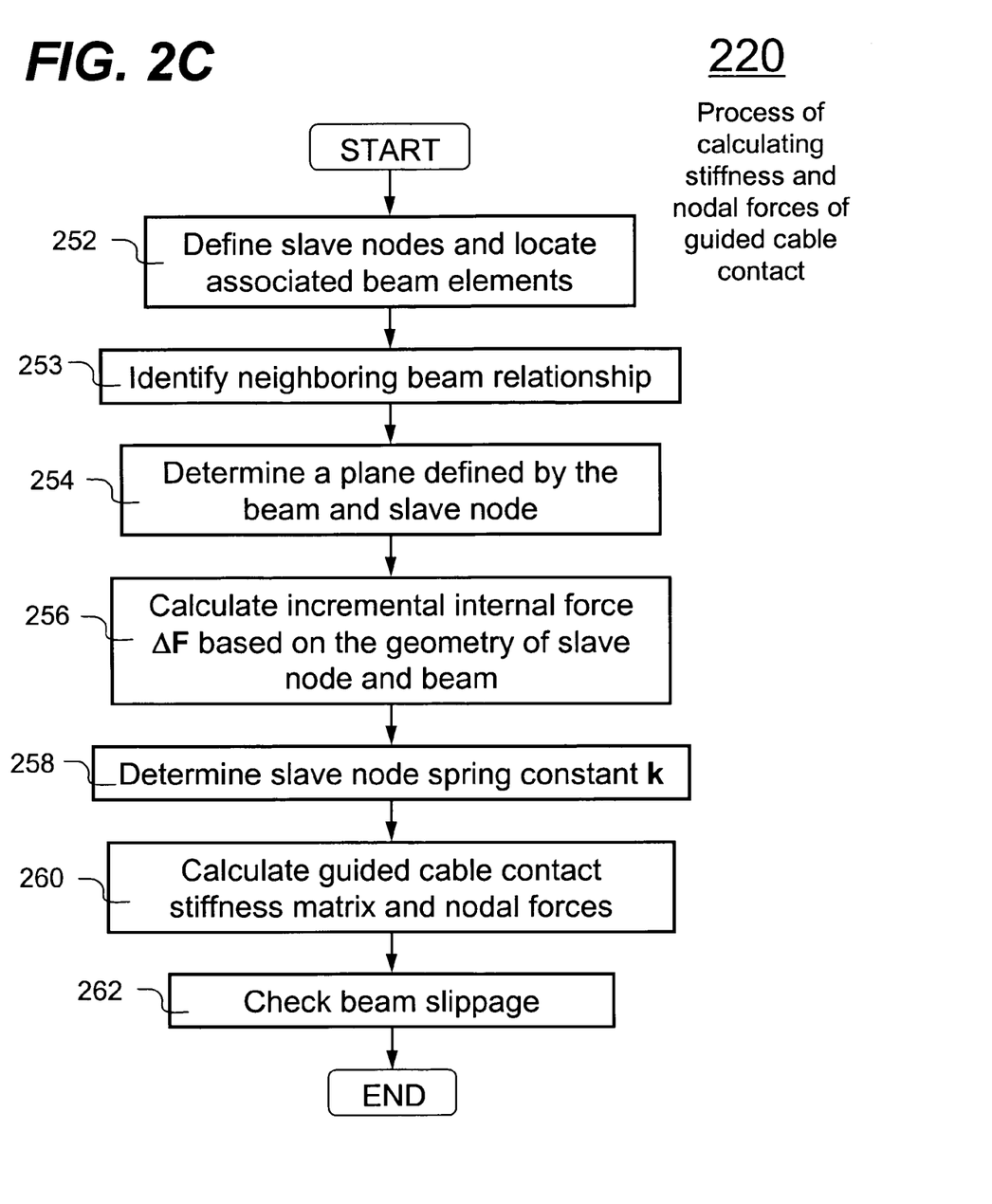
FIG. 2C shows a flowchart or process of calculating stiffness matrix of guided cable contact in accordance with one embodiment of the present invention.

FIG. 2C shows a process 250 or flowchart of calculating the stiffness matrix and nodal forces of a guided cable contact in accordance with one embodiment of the present invention. The process 250, which is preferably understood in conjunction with the other figures especially with FIGS. 2A, 2B, 3, 4A and 4B, may be implemented in software, hardware, or a combination of both. At 252, the process 250 defines a plurality of slave nodes (e.g., node S 306 in FIG. 3), then the process 250 automatically locates the corresponding beam element for each of the slave nodes in the FEA model. The FEA model may contain tens of thousands of nodes and elements. In one embodiment, the definition of the slave nodes may include, but not be limited to, a part number, a group of node numbers, and a like. At 253, the process 250 identifies the neighboring relationship of the beam elements. In one embodiment, the adjacent beams are stored in a linked list. Each beam element has two end nodes; each is represented by a nodal point in three-dimensional space. The slave node and the two end nodes for the beam define a unique two-dimensional (2-D) plane at 254. In the 2-D plane, a normal vector (i.e., vector n 318 in FIG. 3) is established by the slave node and its projection point (projection point P 308 in FIG. 3) on the beam. At 256, the incremental internal forces (i.e., $\Delta F_s$ 316, $\Delta F_a$ 312, and $\Delta F_b$ 314 in FIG. 3) at the slave node and at the two end nodes of the beam are calculated using the geometric relationship extracted from the locations of the slave nodes and the orientation of the beam. The derivation of the internal forces can be found in equations 404 and 408 as shown in FIG. 4A.

In order to maintain a slave node and corresponding beam relationship, at 258, a spring (i.e., k 322 in FIG. 3) is placed between the slave node and its projection point on the beam. The spring constant is then chosen to be substantially stiffer than that of the beam. This is to minimize the relative movements between the slave node and the beam. Then at 260, the process 250 calculates the guided cable contact nodal forces based on equations 408 in FIG. 4A for the explicit analysis (e.g., process 220 in FIG. 2B), and the stiffness matrix K of the guided cable contact at slave nodes and at two end nodes of the beam based on equations 412, 414 and 418 in FIG. 4B for the implicit analysis (e.g., process 200 in FIG. 2A). Finally at 262, the process 250 checks the slippage of each of the beams to ensure the contact between adjacent beams is properly accounted for.

Figure 3:
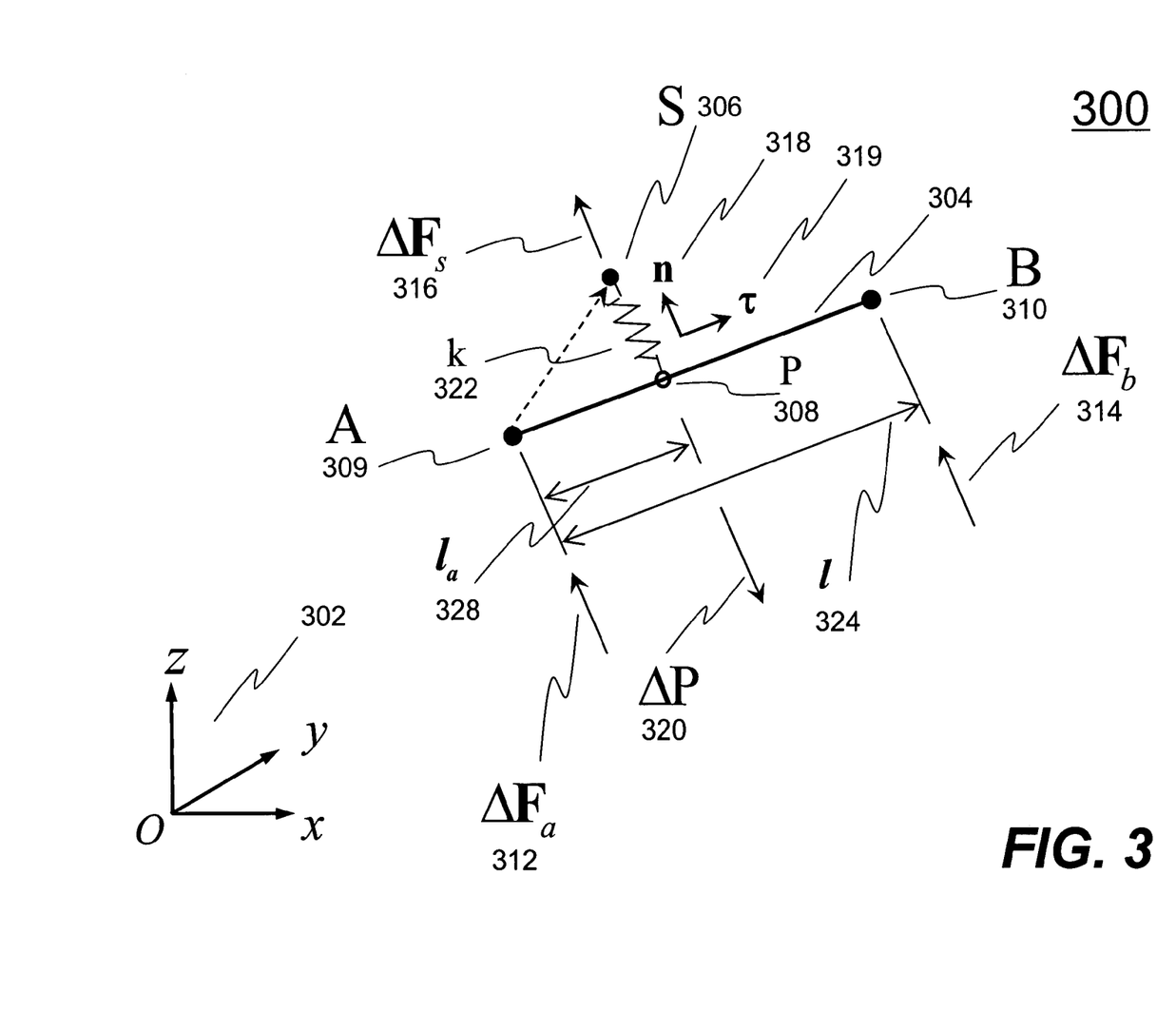
FIG. 3 depicts an exemplary guided cable contact in a global coordinate system in accordance with one embodiment of the present invention.

With reference now to FIG. 3, it depicts an exemplary guided cable contact 300 in a global coordinate system in accordance with one embodiment of the present invention. A global Cartesian coordinate system 302 is used for defining the FEA model. The beam element 304 situates with an arbitrary orientation in three-dimensional (3-D) space. The geometry of the beam is defined by two end nodes: a first end node A 309 and a second end node B 310. An associated slave node S 306 is located in another location in the 3-D space. The slave node's projection point on the beam is defined as point P 308, which is located between the first end node A 309 and the second end node B 310. The length of the beam is denoted as l 324 and the distance between the first end node A and the point P is denoted as $l_a$ 328. The slave node S 306 and the beam 304 define a two-dimensional plane. A set of orthogonal unit vectors of n 318 and τ 319 is defined in the 2-D plane. The unit vector τ 319 is in the tangential direction of the beam 304 and is defined by the direction from the first node A 309 to the second node B 310. The normal unit vector n 318 is in the perpendicular direction of the beam and is defined by the direction from the projection point P 308 to the slave node S 306. Both unit vectors n and τ are defined in the global coordinate system 302. Each of the unit vectors is a 3 by 1 vector representing three translational components (x,y,z). The distance between the point P 308 and the slave node S 306 is defined as D. A spring k 322 is placed between node S 306 and point P 308 to maintain the slave node and corresponding beam relationship. In one embodiment, the spring constant k 322 is chosen to be substantially stiffer than that of the beam element. For example, the spring constant k 322 may be chosen, not be limited to, as nodal mass dividing by time step squared ($\alpha M/\Delta t^2$) or axial stiffness of the beam ($\beta K_{axial}$). The external slave nodal force differential between solution cycles is denoted as $\Delta P$ 320. The corresponding deflection is denoted as $\Delta D$. The nodal force vector at slave node is denoted as $\Delta F_s$ 316. The nodal force vectors for the first and the second nodes of the beam are $\Delta F_a$ 312 and $\Delta F_b$ 314, respectively. And the nodal deformation vectors corresponding to the nodal force arrays $\Delta F_s$, $\Delta F_a$ and $\Delta F_b$ are denoted as $\Delta d_s$, $\Delta d_a$ and $\Delta d_b$, respectively.

Figure 4A:
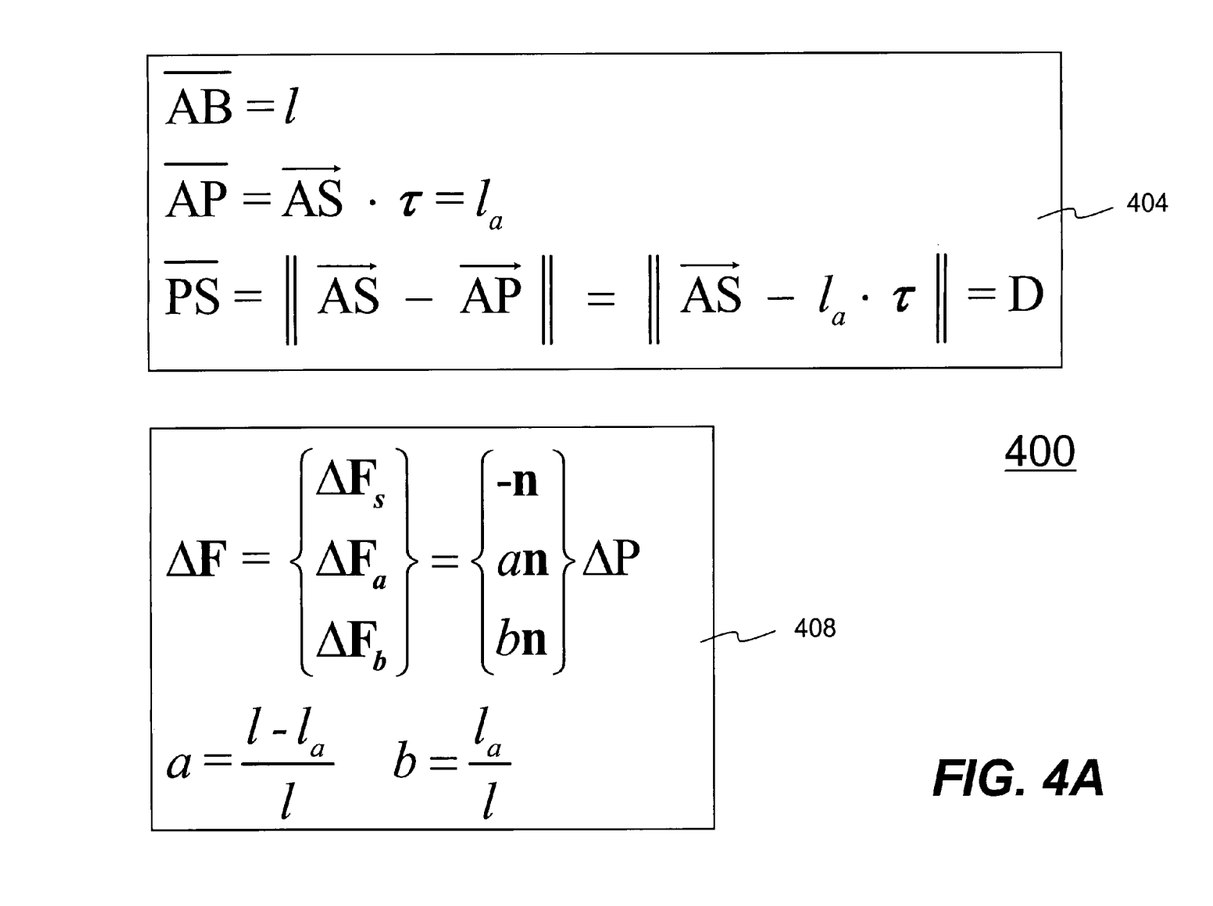
FIG. 4A lists the derivation of the equations of nodal forces vector of the exemplary guided cable contact depicted in FIG. 3.
Figure 4B:
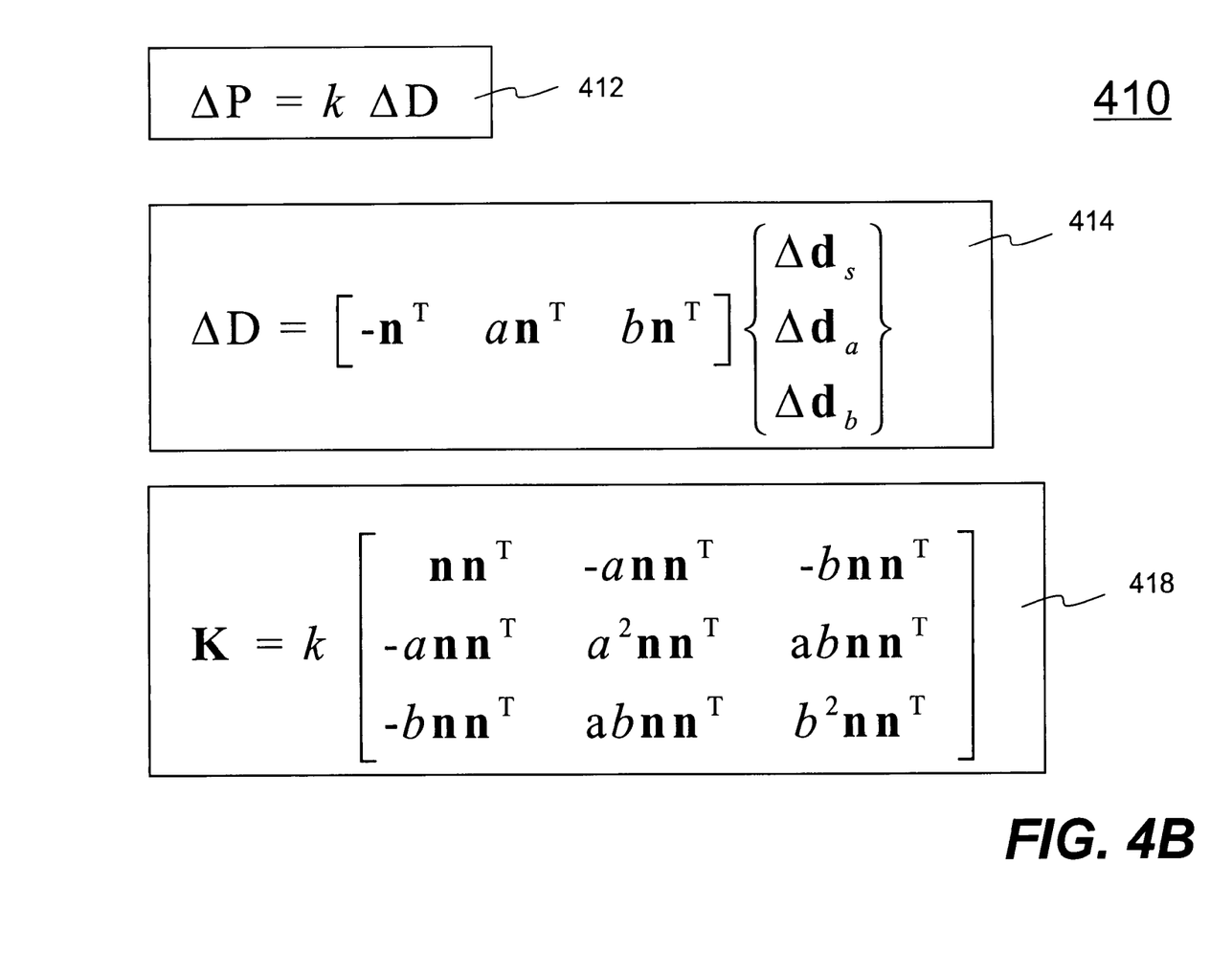
FIG. 4B lists the derivation of the equations of the global stiffness matrix of the exemplary guided cable contact depicted in FIG. 3.

FIGS. 4A and 4B list the derivation (i.e., 400 and 410) of the equations of the nodal force arrays and the stiffness matrix of the exemplary guided cable contact (i.e., 300 in FIG. 3). The derivation 400 and 410, which is preferably understood in conjunction with FIGS. 2A, 2B and 3, may be implemented in software, hardware, or a combination of both. The derivation 400 in FIG. 4A includes two set of equations 404 and 408. The equations 404 show the geometric relationship between the slave node (i.e., node S 306 in FIG. 3), its projection point (i.e., point P 308), and two end nodes of the beam (i.e., the first end node A 309 and the second node B 310). The distance D between the slave node S 306 and its projection point P 308, the length l 324 of the beam, and the distance $l_a$ 328 between the first end node A 309 and the projection point P 308, are mathematically defined in equations 404. Derived from the simply supported beam theory in equations 408, the relationship between the slave node force difference $\Delta P$ 320 and the nodal force array $\Delta F$. The node force array $\Delta F$ includes the nodal force vectors $\Delta F_s$ 316, $\Delta F_a$ 312 and $\Delta F_b$ 314 at slave node 306, the first end node 309 and the second end node 310 of the beam 304, respectively.

FIG. 4B lists the derivation 410 of the stiffness matrix K of the exemplary guided cable contact 300 as shown in FIG. 3. The spring constant k 322 is assigned to a spring connecting the slave node S 306 and its projection point P 308 on the beam 304. Therefore in equation 412, the external slave nodal force differential $\Delta P$ 320 and its corresponding deflection $\Delta D$ have a direct linear proportional relationship based on Hooke's law with the spring constant k 322. Equation 414 shows that how the deflection $\Delta D$ is calculated based upon the unit normal vector n (328 in FIG. 3), the beam length l 424, the distance $l_a$ 428, and the nodal deformation vectors $\Delta d_s$, $\Delta d_a$ and $\Delta d_b$. Using equations 408, 412 and 414, the resulting stiffness matrix K of the guided cable element is presented in equation 418. The normal vector n is a 3 by 1 vector and the transpose of the normal vector is 1 by 3, so the multiplication of the normal vector with its transpose produces a 3×3 matrix denoted as $nn^T$ in equation 418. The 9 by 9 guided cable contact stiffness matrix K can be used in either an implicit or explicit FEA. It is noted that the derivations 400 and 410 are carried out in the global coordinate system. Thus, the transformation from the local element to the global coordinate system is not required.

Figure 5A:
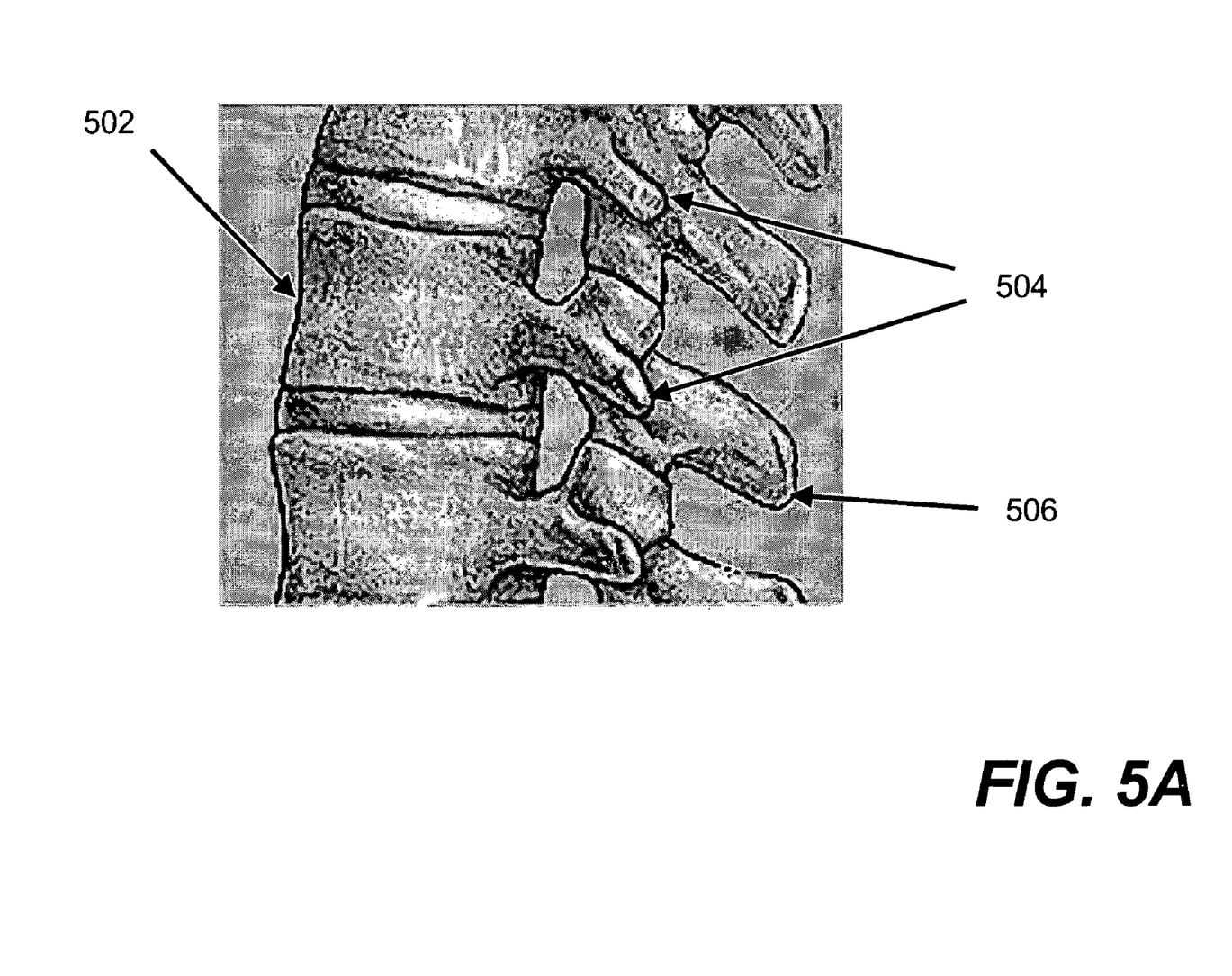
FIGS. 5A-5C show the muscle and bone structure of a human spinal column, which can be modeled in FEA using a guided cable contact in accordance with one embodiment of the present invention.
Figure 5B:
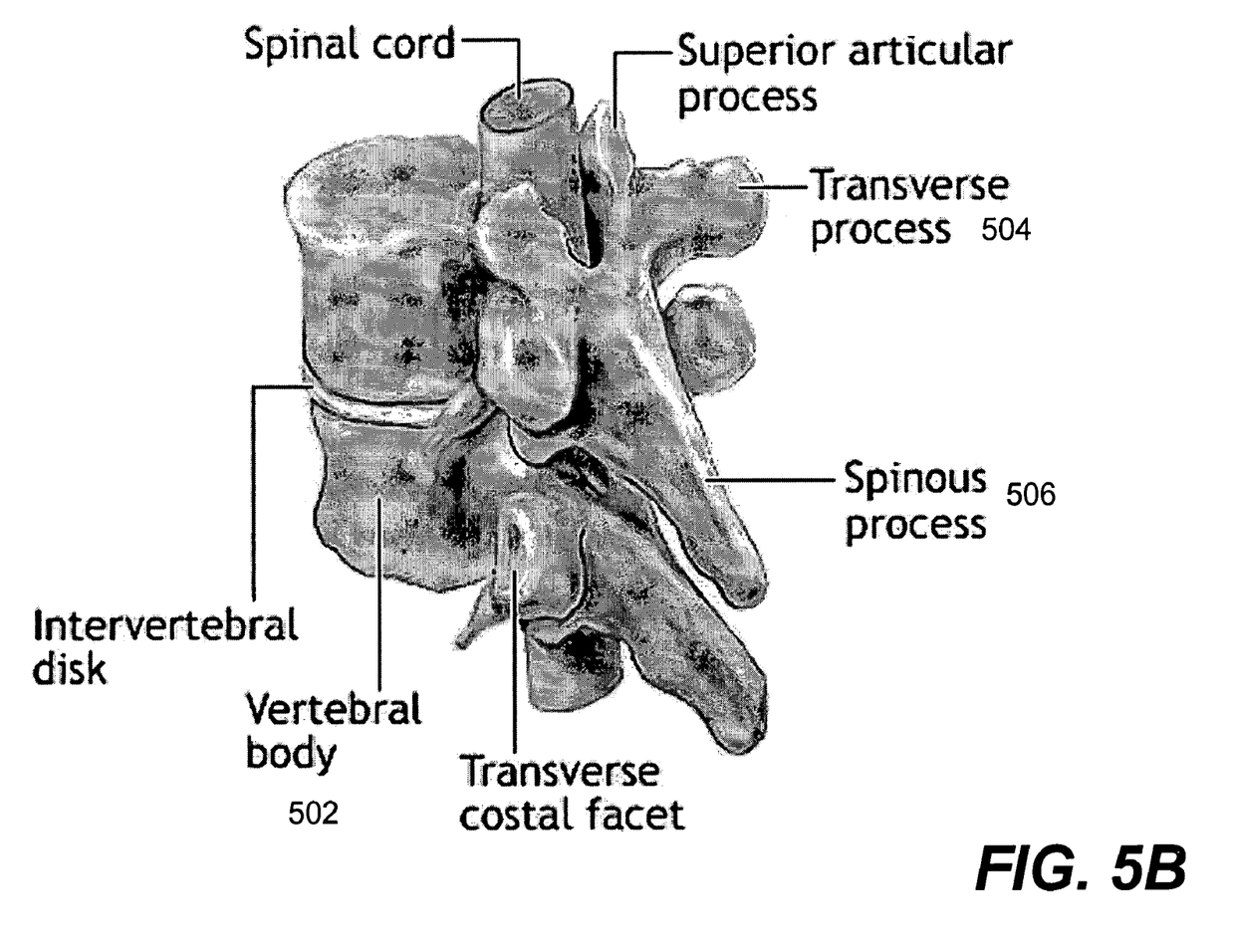
Figure 5C:
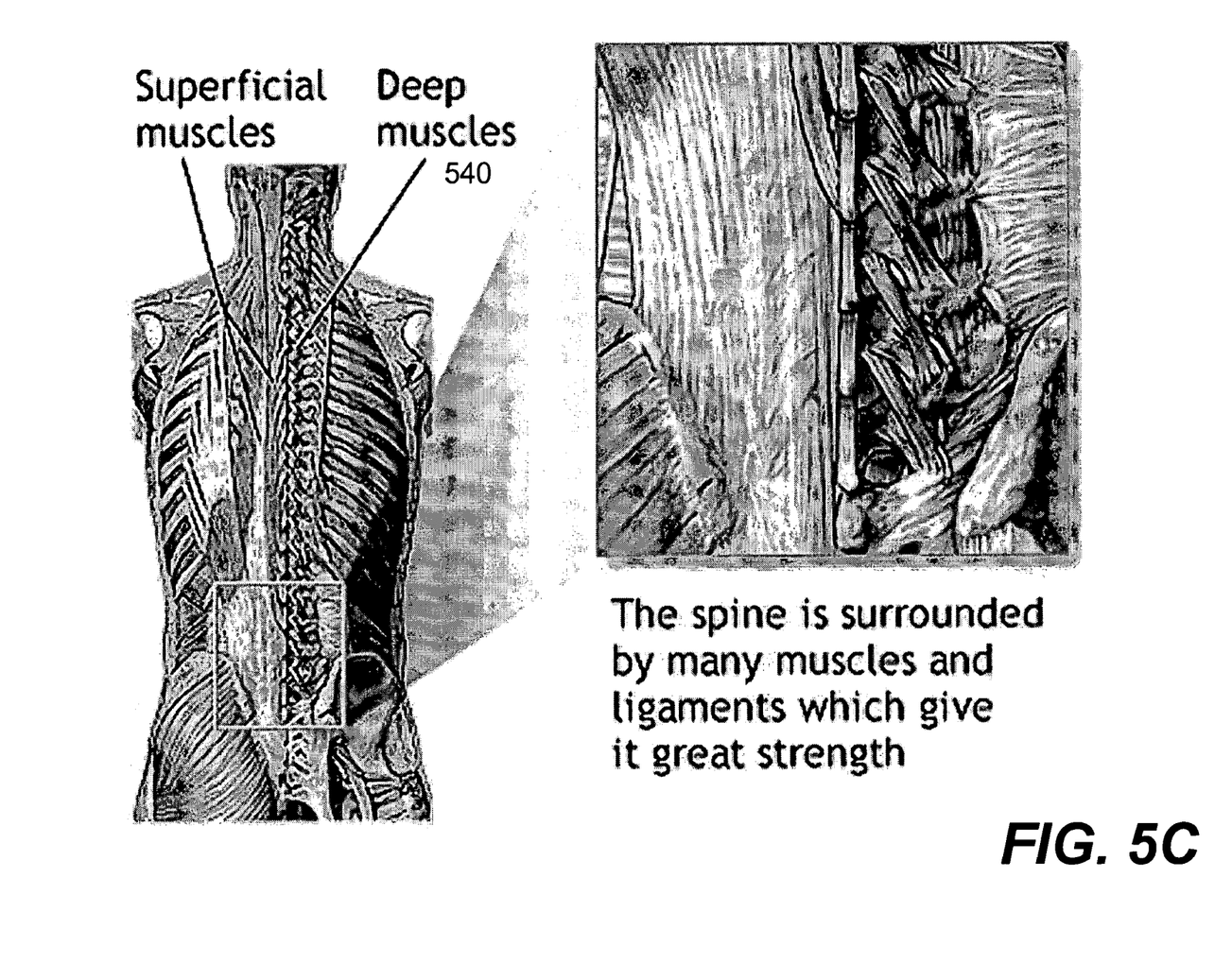

FIGS. 5A-5C show the muscle and bone structure of a human spinal column, which can be modeled in FEA using a guided cable contact in accordance with one embodiment of the present invention. FIG. 5A shows a profile or lateral view of the human spinal column, and FIG. 5B shows a prospective view. In one embodiment, the spinal column is modeled as a guided cable contact. When a human moves his/her body, the movements of the spinal column is controlled by the back muscles and ligaments (e.g., 540 in FIG. 5C) attaching to it through each of the transverse process (e.g., 504 in FIGS. 5A and 5B) and at spinous process (e.g., 506 in FIGS. 5A and 5B) locations. The movements of muscles and ligaments are modeled as the beam element, while each of the corresponding vertebrae (e.g., 502 in FIGS. 5A and 5B) in the spinal column is modeled as the slave nodes of the guided cable contact.

Although an exemplary embodiment of invention has been disclosed, it will be apparent to those skilled in the art that various changes and modifications may be made to achieve the advantage of the invention. It will be obvious to those skilled in the art that some components may be substituted with another component providing same function. The appended claims cover the present invention.

What is claimed is:

1. A method for modeling one or more guided cable contacts in a time-domain simulation of finite element analysis, the method comprising:
    defining a plurality of material properties and a geometry of a structure including said one or more guided cable contacts, wherein the structure is represented by a plurality of nodes and a plurality of elements;
    assigning initial displacements, velocities and accelerations of each of the nodes;
    determining a current solution cycle and a time step;
    when the current solution cycle is less than termination time, calculating guided cable contact stiffness matrix for said one or more guided cable contacts with following steps: defining a slave node, locating a beam having a first and a second end node, establishing a normal vector between a projection point and the slave node, determining a spring constant used for connecting the slave node and the beam and calculating incremental internal forces using the spring constant, the normal vector, length of the beam, and distance between the first end node and the projection point;
    calculating internal loads array; and
    obtaining nodal displacements.

2. The method of claim 1, said defining a plurality of material properties further comprising:
    defining a constitutive law for each of the materials; and
    assigning one of the material properties to each of the elements.

3. The method of claim 1, wherein the guided cable contact stiffness matrices are symmetric and defined in a global coordinate system.

4. The method of claim 1, wherein the slave node and the beam defines a unique plane and the projection point is between the first and second end node of the beam.

5. The method of claim 4, wherein each of the slave node, the first end node, and the second end node, has three translational degrees-of-freedom.

6. The method of claim 1, wherein the spring constant is substantially stiffer than that of the beam.

7. The method of claim 1, wherein the slave node is used for representing one of vertebrae and the beam is used for representing movements of a human spinal column caused by back muscles and ligaments attaching to spinous process.

8. The method of claim 1, wherein obtaining incremental nodal displacements is based on implicit or explicit scheme.

9. The method of claim 1, wherein the guided cable contacts are used for modeling a human spinal column.

10. A computer program product including a computer usable medium having computer readable code embodied in the medium for causing an application module to execute on a computer for modeling one or more guided cable contacts in a time domain simulation of finite element analysis, the computer program product comprising:
    computer readable code for defining a plurality of material properties and a geometry of a structure including said one or more guided cable contacts, wherein the structure is represented by a plurality of nodes and a plurality of elements;
    computer readable code for assigning initial displacements, velocities and accelerations of each of the nodes;
    computer readable code for determining a current solution cycle and a time step;
    when the current solution cycle is less than termination time, computer readable code for calculating guided cable contact stiffness matrix for said one or more guided cable contacts with following steps: defining a slave node, locating a beam having a first and a second end node, establishing a normal vector between a projection point and the slave node, determining a spring constant used for connecting the slave node and the beam and calculating incremental internal forces using the spring constant, the normal vector, length of the beam, and distance between the first end node and the projection point;
    computer readable code for calculating internal load array; and
    computer readable code for obtaining nodal displacements.

11. The computer program product of claim 10, said defining a plurality of material properties and a geometry further comprising:
    computer readable code for defining a constitutive law for each of the materials; and
    computer readable code for assigning one of the material properties to each of the elements.

12. The computer program product of claim 10 wherein the guided cable contact stiffness matrices are symmetric and defined in a global coordinate system.

13. The computer program product of claim 10, wherein the slave node and the beam defines a unique plane and the projection point is between the first and second end node of the beam.

14. The computer program product of claim 13, wherein each of the slave node, the first end node, and the second end node, has three translational degrees-of-freedom.

15. The computer program product of claim 10, wherein the spring constant is substantially stiffer than that of the beam.

16. A system for modeling one or more guided cable contacts in a time-domain simulation of finite element analysis, the system comprising:
    an I/O interface;
    a communication interface;
    a secondary memory;
    a main memory for storing computer readable code for an application module;
    at least one processor coupled to the main memory, the secondary memory, the I/O interface, and the communication interface, said at least one processor executing the computer readable code in the main memory to cause the application module to perform operations of:

defining a plurality of material properties and a geometry of a structure including said one or more guided cable contacts, wherein the structure is represented by a plurality of nodes and a plurality of elements;

assigning initial displacements, velocities and accelerations of each of the nodes;

determining a current solution cycle and a time step;

when the current solution cycle is less than termination time, calculating guided cable contact stiffness matrix for said one or more guided cable contacts with following steps: defining a slave node, locating a beam having a first and a second end node, establishing a normal vector between a projection point and the slave node, determining a spring constant used for connecting the slave node and the beam and calculating incremental internal forces using the spring constant, the normal vector, length of the beam, and distance between the first end node and the projection point;

calculating internal load array; and obtaining nodal displacements.

17. The system of claim 16, said defining a plurality of material properties further comprising:

defining a constitutive law for each of the materials; and assigning one of the material properties to each of the elements.

* * * * *